(12) United States Patent
Kang et al.

(10) Patent No.: US 12,176,733 B2
(45) Date of Patent: Dec. 24, 2024

(54) WIRELESS POWER SYSTEM, WIRELESS POWER TRANSMITTING APPARATUS AND METHOD FOR CONTROLLING WIRELESS POWER TRANSMITTING APPARATUS

(71) Applicant: Samsung Electronics Co., Ltd., Suwon-si (KR)

(72) Inventors: Mijo Kang, Suwon-si (KR); Mukyong Kim, Suwon-si (KR); Sunjin Kim, Suwon-si (KR); Sangjin Jeong, Suwon-si (KR); Kwangyoun Kim, Suwon-si (KR); Kyungah Chang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 17/520,413

(22) Filed: Nov. 5, 2021

(65) Prior Publication Data

US 2022/0140660 A1    May 5, 2022

Related U.S. Application Data

(63) Continuation of application No. PCT/KR2021/015314, filed on Oct. 28, 2021.

(30) Foreign Application Priority Data

Nov. 4, 2020   (KR) .................. 10-2020-0146146

(51) Int. Cl.
| | |
|---|---|
| *H02J 50/80* | (2016.01) |
| *H02J 50/12* | (2016.01) |
| *H02J 50/40* | (2016.01) |

(52) U.S. Cl.
CPC .............. *H02J 50/80* (2016.02); *H02J 50/12* (2016.02); *H02J 50/402* (2020.01)

(58) Field of Classification Search
CPC ..................................................... H02J 50/80
See application file for complete search history.

(56) References Cited

U.S. PATENT DOCUMENTS

| 9,735,583 B2 | 8/2017 | van Wageningen et al. |
| 10,454,308 B2 | 10/2019 | Kwon et al. |

(Continued)

FOREIGN PATENT DOCUMENTS

| CN | 101971453 B | 11/2014 |
| CN | 107087319 A | 8/2017 |

(Continued)

OTHER PUBLICATIONS

International Search Report and Written Opinion of the International Searching Authority in connection with International Application No. PCT/KR2021/015314 issued Feb. 25, 2022, 8 pages.

(Continued)

*Primary Examiner* — Daniel Kessie

(57) ABSTRACT

A provided wireless power system includes a plurality of wireless devices, and a wireless power transmitting apparatus including a plurality of transmitting coils, which transmit wireless power to the plurality of wireless devices, and a control panel, wherein the wireless power transmitting apparatus displays, on the control panel, a guide screen related to a selection of simultaneous control or sequential control of the plurality of wireless devices based on the sum of required powers of the plurality of wireless devices in relation to a preset maximum power.

10 Claims, 12 Drawing Sheets

(56) References Cited

U.S. PATENT DOCUMENTS

| | | |
|---|---|---|
| 2014/0175895 A1 | 6/2014 | Ishi et al. |
| 2014/0300315 A1 | 10/2014 | Wakabayashi |
| 2015/0147441 A1* | 5/2015 | Lagerlof .................. F24C 7/08 |
| | | 99/332 |
| 2015/0263548 A1 | 9/2015 | Cooper et al. |
| 2015/0312969 A1* | 10/2015 | Hazir .................... H05B 6/062 |
| | | 219/621 |
| 2016/0268833 A1 | 9/2016 | Lee et al. |
| 2017/0196399 A1* | 7/2017 | Ayre ...................... A47J 33/00 |
| 2017/0366034 A1* | 12/2017 | Matsui ............... H02J 7/00034 |
| 2018/0376540 A1* | 12/2018 | Heo .................... H05B 1/0266 |
| 2019/0131824 A1 | 5/2019 | Suga et al. |
| 2019/0195508 A1* | 6/2019 | Yun ....................... H05B 6/062 |

FOREIGN PATENT DOCUMENTS

| | | |
|---|---|---|
| JP | 4909718 B2 | 4/2012 |
| JP | 2012-123912 A | 6/2012 |
| JP | 2014013431 A | 1/2014 |
| JP | 5791441 B2 | 10/2015 |
| JP | 2015223055 A | 12/2015 |
| JP | 2019192421 A | 10/2019 |
| KR | 10-1222772 B1 | 1/2013 |
| KR | 10-2013-0025502 A | 3/2013 |
| KR | 10-2013-0044763 A | 5/2013 |
| KR | 10-1701712 B1 | 2/2017 |
| KR | 10-1897160 B1 | 9/2018 |
| KR | 10-2018-0108923 A | 10/2018 |
| KR | 10-2118407 B1 | 6/2020 |
| WO | 2018155881 A1 | 8/2018 |

OTHER PUBLICATIONS

Supplementary European Search Report dated Feb. 5, 2024, in connection with European Patent Application No. 21889459.0, 9 pages.

* cited by examiner

| CLASSIFICATION | SIMULTANEOUS CONTROL | | SEQUENTIAL CONTROL | |
|---|---|---|---|---|
| | KETTLE | BLENDER | KETTLE | BLENDER |
| OPERATING POWER | 1400W | 800W | 1600W | 800W |
| OPERATION TIME | 15min | 10min | 10min | 10min |
| DRIVING | SIMULTANEOUSLY OPERATE KETTLE AND BLENDER | | OPERATE BLENDER AFTER OPERATION OF KETTLE IS COMPLETED | |

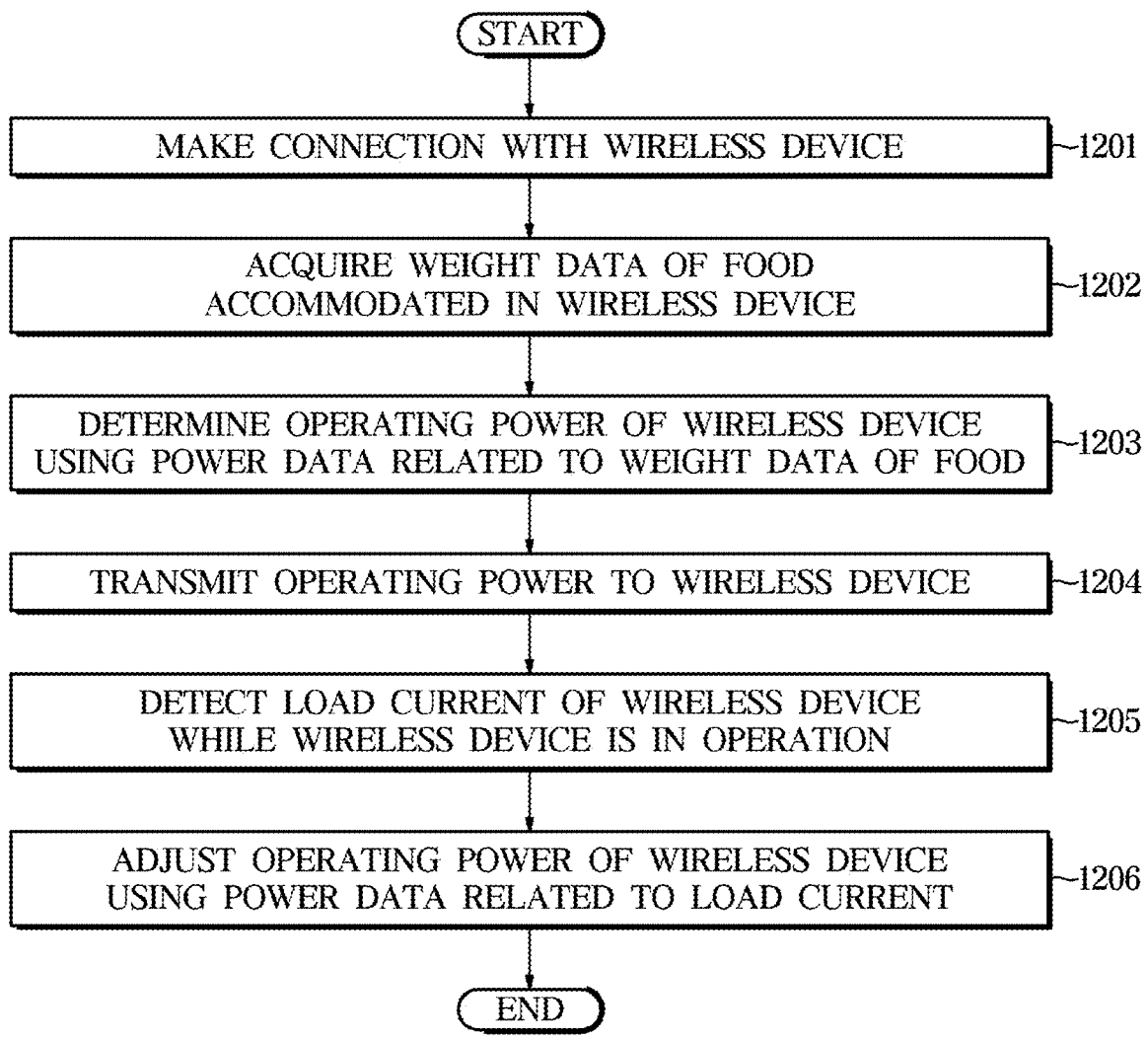

WIRELESS POWER SYSTEM, WIRELESS POWER TRANSMITTING APPARATUS AND METHOD FOR CONTROLLING WIRELESS POWER TRANSMITTING APPARATUS

CROSS-REFERENCE TO RELATED APPLICATIONS

This application is a continuation of International Patent Application No. PCT/KR2021/015314 filed on Oct. 28, 2021, which claims priority to Korean Patent Application No. 10-2020-0146146 filed on Nov. 4, 2020, the disclosures of which are herein incorporated by reference in their entirety.

BACKGROUND

1. Field

The disclosed invention relates to a wireless power system which is capable of supplying wireless power to a plurality of wireless devices, a wireless power transmitting apparatus, and a method of controlling the wireless power transmitting apparatus.

2. Description of Related Art

Recently, technologies for supplying wireless power have been developed and applied to many electronic devices. Electronic devices, to which wireless power transmission technologies are applied, may wirelessly receive power without requiring a direct connection to a charging connector. For example, technologies have been developed to supply wireless power to various home appliances using products such as cooktops including an induction oven.

Wireless power transmission technologies include a magnetic induction method using a magnetic induction phenomenon between a primary coil and a secondary coil and a magnetic resonance method in which a primary coil and a secondary coil use the same frequency.

On the other hand, the conventional wireless power transmitting apparatus can only transmit wireless power having a predetermined magnitude to a wireless device and cannot control the wireless power to be transmitted. Accordingly, when power required by a plurality of wireless devices exceeds maximum power that can be supplied by the conventional wireless power transmitting apparatus, the conventional wireless power transmitting apparatus cannot operate all of the plurality of wireless devices.

The disclosed invention is directed to providing a wireless power system which is capable of, when a required power of a plurality of wireless devices exceeds a maximum power of a wireless power transmitting apparatus, adjusting an operating power to be transmitted to each wireless device, a wireless power transmitting apparatus, and a method of controlling the wireless power transmitting apparatus.

The disclosed invention is also directed to providing a wireless power system which is capable of determining an operating power of a wireless device according to a weight of food accommodated in the wireless device and adjusting the operating power of the wireless device according to a change in load current of the wireless device, a wireless power transmitting apparatus, and a method of controlling the wireless power transmitting apparatus.

SUMMARY

According to one embodiment of the present invention, a wireless power system includes a plurality of wireless devices, and a wireless power transmitting apparatus including a plurality of transmitting coils, which transmit wireless power to the plurality of wireless devices, and a control panel, wherein the wireless power transmitting apparatus is configured to display, on the control panel, a guide screen related to a selection of simultaneous control or sequential control of the plurality of wireless devices based on a sum of required powers of the plurality of wireless devices in relation to a preset maximum power.

The wireless power transmitting apparatus may check the required power of each wireless device based on an operation setting for each of the plurality of wireless devices, and when the sum of the required powers exceeds the preset maximum power, the wireless power transmitting apparatus may display the guide screen related to the selection of the simultaneous control or the sequential control on the control panel.

In response to the selection of the simultaneous control input through the control panel, the wireless power transmitting apparatus may transmit an adjusted operating power to at least one wireless device of the plurality of wireless devices such that total wireless power transmitted to the plurality of wireless devices is less than or equal to the preset maximum power, and in response to the selection of the sequential control input through the control panel, the wireless power transmitting apparatus may transmit the required power to each of the plurality of wireless devices in an order determined when the sequential control is selected.

The wireless power transmitting apparatus may check whether power for each of the plurality of wireless devices is adjustable, and when the plurality of wireless devices include a first wireless device of which power is adjustable and a second wireless device of which power is non-adjustable, during the simultaneous control, the wireless power transmitting apparatus may adjust an operating power of the first wireless device such that total wireless power transmitted to the plurality of wireless devices is less than or equal to the preset maximum power.

The wireless power transmitting apparatus may display a first operation time of the first wireless device determined according to the adjustment of the operating power of the first wireless device and a second operation time of the second wireless device set through the operation setting on the control panel as information about the simultaneous control.

When an operation of the second wireless device is ended first, the wireless power transmitting apparatus may change the operating power of the first wireless device into a required power of the first wireless device at a time point at which the operation of the second wireless device is ended and may display a remaining time until an end of an operation of the first wireless device.

When the plurality of wireless devices include a first wireless device of which power is adjustable and a second wireless device of which power is adjustable, the wireless power transmitting apparatus may adjust an operating power of the first wireless device or an operating power of the second wireless device based on an operation time of the first wireless device and an operation time of the second wireless device which are set through the operation setting.

When the plurality of wireless devices include a first wireless device of which power is adjustable and a second wireless device of which power is adjustable, the wireless power transmitting apparatus may adjust an operating power of the first wireless device or an operating power of the second wireless device based on types of driving areas in which the first wireless device and the second wireless device are positioned.

The wireless power transmitting apparatus may display an operation time of the first wireless device and an operation time of the second wireless device, which are set through the operation setting, on the control panel as information about the sequential control.

The wireless power transmitting apparatus may obtain a weight of food accommodated in each of the plurality of wireless devices and further use power data related to the weight of the food to determine the required power for each of the plurality of wireless devices.

According to one embodiment of the present invention, a wireless power transmitting apparatus includes a plate, a control panel including an inputter and a display, a plurality of transmitting coils configured to transmit wireless power to a plurality of wireless devices positioned on an upper surface of the plate, a driving circuit configured to apply a current to each of the plurality of transmitting coils, a communication module configured to communicate with the plurality of wireless devices, and a controller configured to control the control panel to display a guide screen related to selection of simultaneous control or sequential control of the plurality of wireless devices based on a sum of required powers of the plurality of wireless devices and preset maximum power.

The controller may check the required power of each wireless device based on an operation setting for each of the plurality of wireless devices, and when the sum of the required powers exceeds the preset maximum power, the controller may control the control panel to display the guide screen related to the selection of the simultaneous control or the sequential control.

In response to the selection of the simultaneous control input through the control panel, the controller may adjust an operating power of at least one wireless device of the plurality of wireless devices such that total wireless power transmitted to the plurality of wireless devices is less than or equal to the preset maximum power, and in response to the selection of the sequential control input through the control panel, the controller may control the driving circuit to transmit the required power to each of the plurality of wireless devices in an order determined when the sequential control is selected.

The controller may check whether power for each of the plurality of wireless devices is adjustable, and when the plurality of wireless devices include a first wireless device of which power is adjustable and a second wireless device of which power is non-adjustable, during the simultaneous control, the controller may adjust an operating power of the first wireless device such that total wireless power transmitted to the plurality of wireless devices is less than or equal to the preset maximum power.

The controller may control the control panel to display a first operation time of the first wireless device determined according to the adjustment of the operating power of the first wireless device and a second operation time of the second wireless device set through the operation setting as information about the simultaneous control.

When an operation of the second wireless device is ended first, the controller may change the operating power of the first wireless device into a required power of the first wireless device at a time point at which the operation of the second wireless device is ended and may control the display panel to display a remaining time until an end of an operation of the first wireless device.

When the plurality of wireless devices include a first wireless device of which power is adjustable and a second wireless device of which power is adjustable, the controller may adjust an operating power of the first wireless device or an operating power of the second wireless device based on an operation time of the first wireless device and an operation time of the second wireless device, which are set through the operation setting, and types of driving areas in which the first wireless device and the second wireless device are positioned.

The controller may obtain a weight of food accommodated in each of the plurality of wireless devices and further use power data related to the weight of the food to determine the required power for each of the plurality of wireless devices.

According to one embodiment of the present invention, a method of controlling a wireless power transmitting apparatus includes performing a communication connection with a wireless device positioned on an upper surface of a plate, obtaining a weight of food accommodated in the wireless device, determining an operating power of the wireless device using power data related to the weight of the food, and transmitting the operating power to the wireless device.

The transmitting of the operating power may include detecting a load current of the wireless device while the wireless device is in operation and adjusting the operating power of the wireless device using power data related to the load current.

According to the disclosed wireless power system, wireless power transmitting apparatus, and method of controlling the wireless power transmitting apparatus, it is possible to adjust an operating power to be transmitted to a plurality of wireless devices, and it is possible to guide a user to select simultaneous control or sequential control. Accordingly, even when a required power of the plurality of wireless devices exceeds a maximum power of the wireless power transmitting apparatus, the plurality of wireless devices can be efficiently used, and efficient power control is possible.

In addition, according to the wireless power system, the wireless power transmitting apparatus, and the method of controlling the wireless power transmitting apparatus, it is possible to determine an operating power of the wireless device according to a weight of food accommodated in the wireless device, and it is possible to adjust the operating power of the wireless device according to a change in load current of the wireless device. Accordingly, it is possible to efficiently control power and manage an operating time of the wireless device.

Before undertaking the Modes of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is a table for describing simultaneous control and sequential control of a plurality of wireless devices;

FIG. 12 illustrates a method of controlling a wireless power transmitting apparatus for adjusting an operating power according to food accommodated in a wireless device.

DETAILED DESCRIPTION

Figure 1:
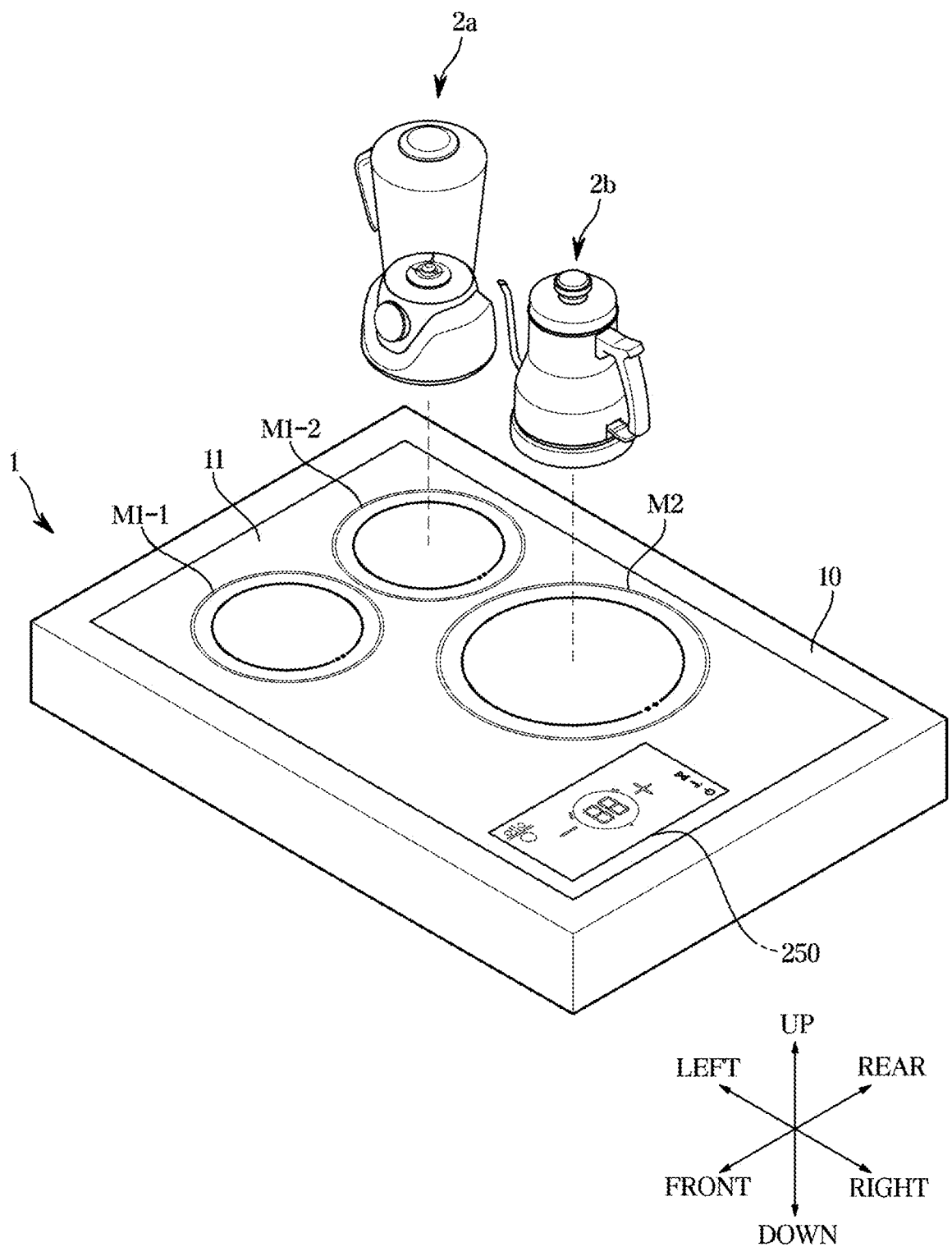
FIG. 1 illustrates a wireless power system including a wireless power transmitting apparatus according to one embodiment.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like reference numerals refer to like elements throughout the specification. The present specification does not describe all elements of embodiments, and common knowledge in the technical field to which the present invention pertains or the same descriptions of the embodiments will be omitted. The term "unit," "module," "member," or "block" used herein may be implemented using hardware or software. According to the embodiments, one component may be implemented as a plurality of "units," "modules," "members," or "blocks," or one "unit," "module," "member," or "block" may include a plurality of components.

Throughout the specification, when a part is referred to as being "connected" to another part, it includes being "directly connected" and "indirectly connected through another component," and the term "indirectly connected" includes "connected through a wireless communication network" or "electrically connected through an electrical line."

In addition, the terms used in the specification are used to describe the embodiments and are not used to restrict or limit the disclosed invention. A single form of expression is meant to include multiple elements unless otherwise stated. It will be further understood that the term "comprise," "include," or "have," when used herein, is used to describe the presence of stated features, numbers, steps, operations, elements, components, and/or combinations thereof but is not used to exclude other features or elements being further included.

In addition, in the specification, terms including ordinal numbers such as "first" and "second" are used to distinguish a plurality of components, and the used ordinal numbers do not indicate the arrangement order, manufacturing order, or importance between the components. A term "and/or" includes a combination of a plurality of associated disclosed items or any item of the plurality of associated disclosed items. Hereinafter, embodiments of the disclosed invention will be described in detail.

FIG. 1 illustrates a wireless power system including a wireless power transmitting apparatus according to one embodiment.

Referring to FIG. 1, the wireless power system may be defined as including a wireless power transmitting apparatus 1 and wireless devices 2. The wireless power transmitting apparatus 1 may supply wireless power to the wireless devices 2 (2a and 2b) capable of receiving wireless power. For example, when the wireless device 2 is positioned in a driving area M1-1, M1-2, or M2 provided on a plate 11 of the wireless power transmitting apparatus 1, the wireless power transmitting apparatus 1 may supply wireless power to the wireless device 2.

The wireless power transmitting apparatus 1 may be provided in various shapes. The wireless power transmitting apparatus 1 having a hexagonal shape shown in FIG. 1 is merely an example. The wireless power transmitting apparatus 1 may be provided in the form of a table.

Figure 2:
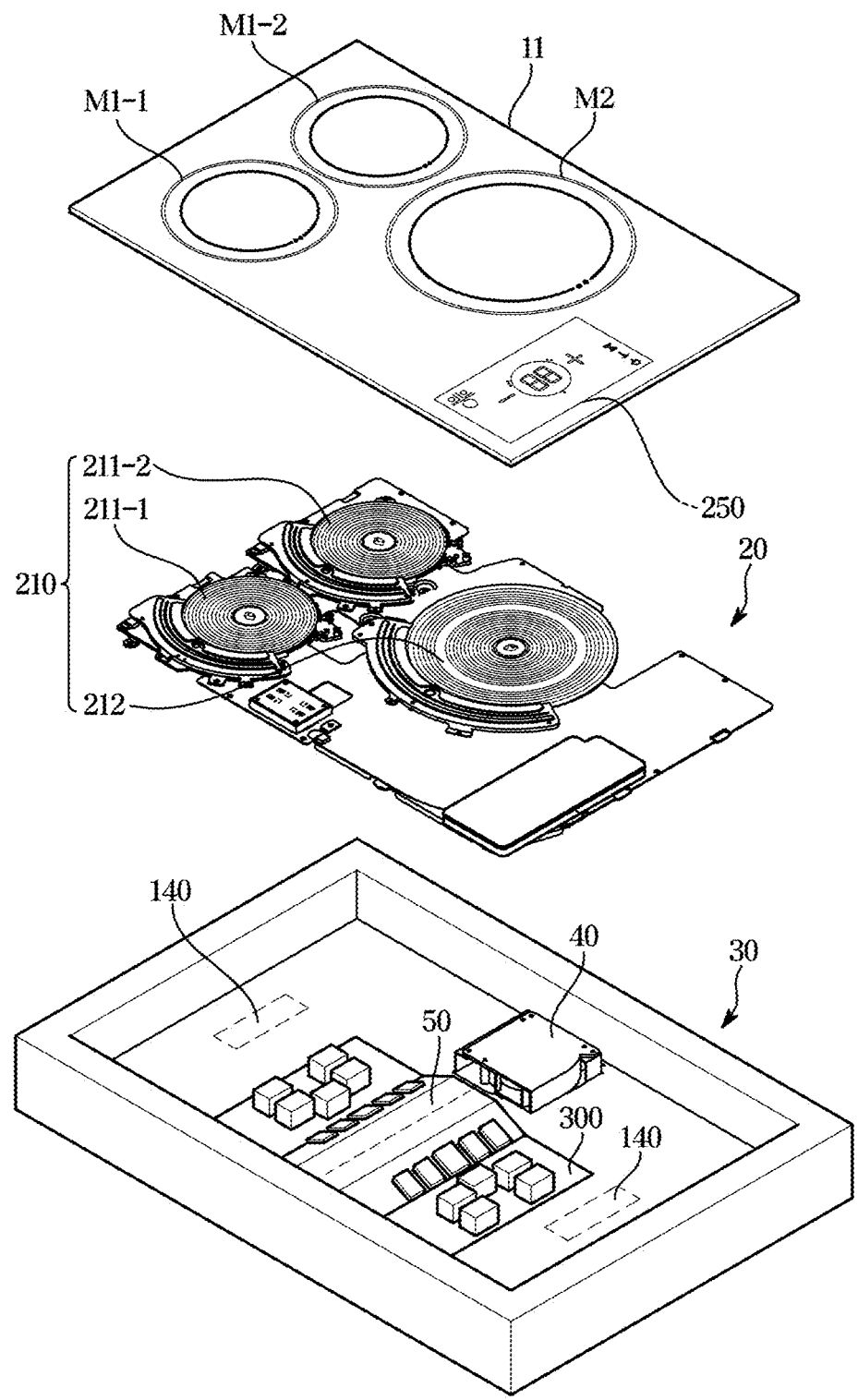
FIG. 2 illustrates the inside of the wireless power transmitting apparatus according to one embodiment.

In addition, the wireless device 2 may include various electronic devices. A blender 2a and an electric kettle 2b shown in FIG. 2 are merely examples of the wireless device 2. The wireless device 2 may also include an electric toaster, a coffee maker, and the like. A bottom surface of the wireless device 2 in contact with the plate 11 may be formed as a flat surface.

The wireless power transmitting apparatus 1 may transmit wireless power to the wireless device 2 using a wireless power transmission technology that uses a known magnetic induction or magnetic resonance method. The magnetic induction method is a method in which a magnetic field of a transmitting coil 210 is changed to induce a voltage in a receiving coil 410, thereby allowing a current to flow in a secondary coil. The magnetic resonance method is a method in which a resonance phenomenon is generated in the transmitting coil 210 and the receiving coil 410 using the same resonant frequency, thereby transmitting power through the resonance phenomenon.

The driving areas M1-1, M1-2, and M2 in which the wireless devices 2 may receive wireless power may be provided on an upper surface of the plate 11. The driving area M1-1, M1-2, or M2 may be provided at a position corresponding to the transmitting coil 210 to be described below. The plurality of driving areas may be provided. In FIG. 1, three driving areas M1-1, M1-2, and M2 are illustrated. The transmitting coil 210 may be provided at a position corresponding to each of the plurality of driving areas M1-1, M1-2, and M2. The driving areas M1-1, M1-2, and M2 may be divided into a first driving area M1-1, a second driving area M1-2, and a third driving area M2 or divided into a first sub-driving area M1-1, a second sub-driving area M1-2, and a main driving area M2.

In addition, the wireless power transmitting apparatus 1 may be connected to an external mobile device (not shown). The wireless power transmitting apparatus 1 may be connected to the external mobile device (not shown) using wireless communication. When the wireless power transmitting apparatus 1 is connected to the external mobile device (not shown), information about an operation of the wireless power transmitting apparatus 1 may be transmitted to the external mobile device (not shown). In addition, the wireless power transmitting apparatus 1 may be controlled using the external mobile device (not shown). In other words, a user may control the wireless power transmitting apparatus 1 using the external mobile device (not shown).

The wireless power transmitting apparatus 1 may include a housing 10 and the plate 11. The housing 10 and the plate 11 may be made of various materials. For example, the plate 11 may be made of tempered glass such as ceramic glass.

A control panel 250 capable of receiving a user input and displaying information about an operation of the wireless power transmitting apparatus 1 may be provided on the plate 11. For example, a user may input a command for selecting simultaneous control or sequential control of the wireless devices 2 using the control panel 250. The control panel 250 may include a display 251 and an inputter 252. The inputter 252 may include at least one of a physical button, a touch button, a touch pad, a knob, a jog shuttle, an operating stick, a track ball, and a track pad. In addition, the control panel 250 may be provided as a touch screen in which the display 251 and the inputter 252 are integrally implemented.

The control panel 250 may be provided at any one of various positions of the wireless power transmitting apparatus 1. In FIG. 1, the control panel 250 is illustrated as being provided on the upper surface of the plate 11. In addition, the control panel 250 may be provided on a front surface, a rear surface, a left surface, or a right surface of the wireless power transmitting apparatus 1.

FIG. 2 illustrates the inside of the wireless power transmitting apparatus according to one embodiment.

Referring to FIG. 2, the wireless power transmitting apparatus 1 may include a coil layer 20 and a driving layer 30 which are provided under the plate 11. In addition, the coil layer 20 and the driving layer 30 may be provided inside the plate 11. The coil layer 20 may be provided under the plate 11 or inside the plate 11 and may include one or more transmitting coils 210. In addition, the coil layer 20 may be accommodated in the housing 10.

In FIG. 2, three transmitting coils 210 are illustrated. The transmitting coils 210 may include a first sub-transmitting coil 211-1, a second sub-transmitting coil 211-2, and a main transmitting coil 212. The transmitting coils 210 are provided at a position corresponding to each of the driving areas M1-1, M1-2, and M2. That is, the first sub-driving area M1-1 may be positioned above the first sub-transmitting coil 211-1, the second sub-driving area M1-2 may be positioned above the second sub-transmitting coil 211-2, and the main driving area M2 may be positioned above the main transmitting coil 212.

The sub-transmitting coils 211-1 and 211-2 may output lower power than the main transmitting coil 212. Each of the sub-transmitting coils 211-1 and 211-2 and the main transmitting coil 212 may be independently driven. The transmitting coil 210 may generate a magnetic field and/or an electromagnetic field based on a current applied from a driving circuit 320 and may transmit wireless power to the wireless device 2.

The driving layer 30 may include the housing 10, a fan 40, a heat sink 50, and a driving assembly 300. The fan 40, the heat sink 50, and the driving assembly 300 may be accommodated in the housing 10. In addition, the driving layer 30 may further include a weight sensor 140.

The fan 40 may circulate heat inside the housing 10 and may serve to radiate the heat inside the housing 10 to the outside of the wireless power transmitting apparatus 1. The heat sink 50 may radiate heat generated in the driving assembly 300. A controller 330 may control the rotation of the fan 40.

The weight sensor 140 may be provided at any one of various positions of the housing 10. For example, the weight sensor 140 may be provided at one of a lower left side and a lower right side of the housing 10. The weight sensor 140 may measure the total weight of the wireless device 2 positioned on the upper surface of the plate 11 and the wireless power transmitting apparatus 1. Weight data acquired by the weight sensor 140 may be used to obtain a weight of food accommodated in the wireless device 2.

The driving assembly 300 may include a communication module 310, a driving circuit 320, and the controller 330. The driving circuit 320 may apply a current to the transmitting coil 210. The controller 330 may be electrically connected to components of the wireless power transmitting apparatus 1 and may control an operation for each of the components. The controller 330 may include a control circuit. The driving assembly 300 may include a printed circuit board, and the communication module 310, the driving circuit 320, and the controller 330 may be installed on one printed circuit board or installed on a plurality of printed circuit boards.

Figure 3:
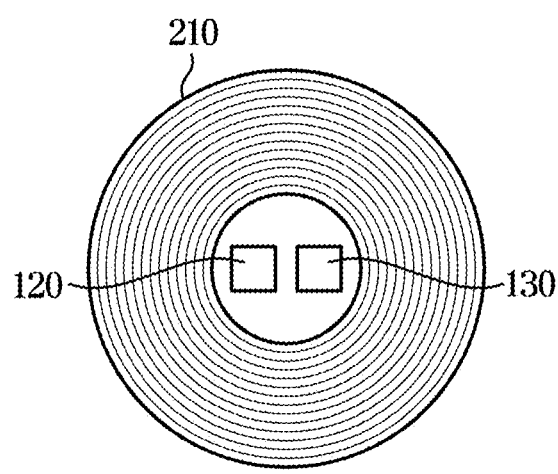
FIG. 3 illustrates a transmitting coil, a device sensor, and a temperature sensor included in the wireless power transmitting apparatus according to one embodiment.

FIG. 3 illustrates a transmitting coil, a device sensor, and a temperature sensor included in the wireless power transmitting apparatus according to one embodiment.

Referring to FIG. 3, the wireless power transmitting apparatus 1 may include a device sensor 120 and a temperature sensor 130. The device sensor 120 and the temperature sensor 130 may be provided on the coil layer 20. For example, the device sensor 120 and the temperature sensor 130 may be positioned at a central portion of the transmitting coil 210. In addition, the device sensor 120 and the temperature sensor 130 may be positioned around the transmitting coil 210.

The device sensor 120 may detect the wireless device 2 placed on the driving area M1-1, M1-2, or M2 of the plate 11. The device sensor 120 may detect a position of the wireless device 2 placed on the plate 11. The device sensor 120 may include a capacitive sensor capable of detecting a change in capacitance caused by the wireless device 2. In addition, the device sensor 120 may include at least one of an infrared sensor, a weight sensor, a micro switch, and a membrane switch. In addition, the device sensor 120 may include various sensors.

The temperature sensor 130 may measure at least one of a temperature of the transmitting coil 210, a temperature of the plate 11, a temperature of the heat sink 50, and an internal temperature of the housing 10. The temperature sensor 130 may include a thermistor of which an electrical resistance value is changed according to a temperature. The temperature sensor 130 may transmit temperature data to the controller 330, and the controller 330 may determine whether overheating occurs based on the temperature data. When the transmitting coil 210 and the plate 11 are overheated, the controller 330 may control the driving circuit 320 to stop wireless power from being transmitted by the transmitting coil 210.

Figure 4:
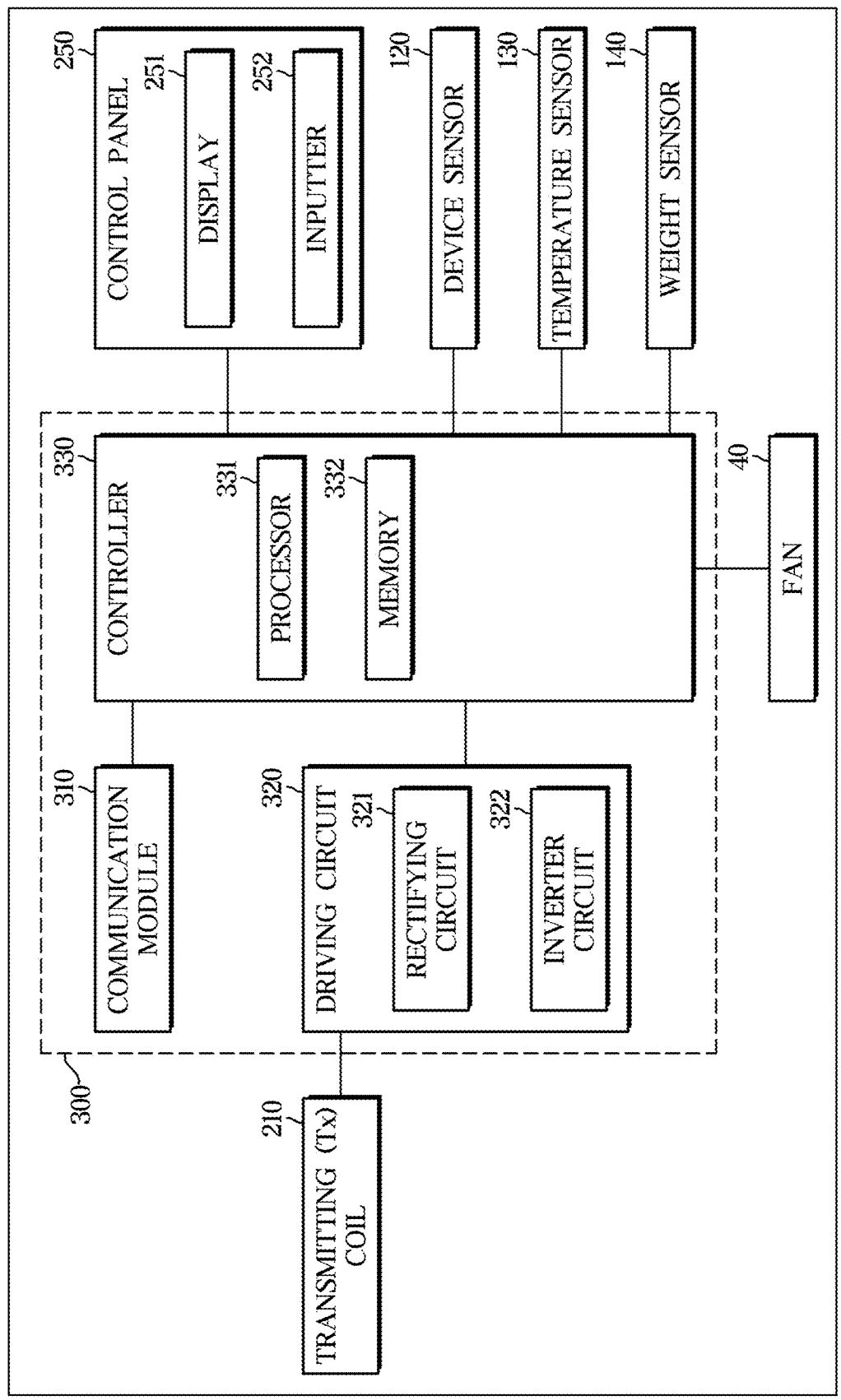
FIG. 4 is a control block diagram of a wireless power transmitting apparatus according to one embodiment.

FIG. 4 is a control block diagram of a wireless power transmitting apparatus according to one embodiment.

Referring to FIG. 4, a wireless power transmitting apparatus 1 according to one embodiment may include a fan 40, a device sensor 120, a temperature sensor 130, a transmitting coil 210, a control panel 250, and a driving assembly 300. In addition, the wireless power transmitting apparatus 1 may further include a weight sensor 140. The driving assembly 300 may include a communication module 310, a driving circuit 320, and a controller 330. The transmitting coil 210 may be driven by a current applied according to an operation of the driving circuit 320. The controller 330 may be electrically connected to components of the wireless power transmitting apparatus 1 and may control an operation for each of the components.

When the device sensor 120 detects a wireless device 2, the device sensor 120 may transmit a wakeup signal to the controller 330. In addition, when a user input is input through a power-on button of the control panel 250, the control panel 250 may transmit a wakeup signal to the controller 330. The controller 330 may turn power of the wireless power transmitting apparatus 1 on or convert the wireless power transmitting apparatus 1 from a standby mode to an operation mode based on the wakeup signal.

Meanwhile, the device sensor 120 may be omitted. In this case, the controller 330 may serve as the device sensor 120. The controller 330 detects a position of the wireless device 2 based on an inductance of the transmitting coil 210 which is changed by the wireless device 2 placed in a driving area M1-1, M1-2, or M2. An inductance of the transmitting coil 210 measured when the wireless device 2 is placed in the driving area M1-1, M1-2, or M2 is different from an inductance of the transmitting coil 210 measured when the wireless device 2 is not present. The controller 330 may control the driving circuit 320 to apply a detection current for detecting the wireless device 2 to the transmitting coil 210. In addition, the wireless device 2 may be detected through various methods.

The weight sensor 140 may measure the total weight of the wireless device 2 positioned on an upper surface of a plate 11 and the wireless power transmitting apparatus 1. Weight data acquired by the weight sensor 140 may be used to obtain a weight of food accommodated in the wireless device 2. The controller 330 may obtain the weight of the food accommodated in the wireless device 2 by subtracting a weight of the wireless power transmitting apparatus 1 and a weight of the wireless device 2 from the total weight of the wireless power transmitting apparatus 1 and the wireless device 2 accommodating the food.

The communication module 310 may communicate with the wireless device 2. In addition, the communication module 310 may communicate with an external mobile device (not shown). The communication module 310 may be implemented using various wireless communication technologies. For example, at least one of radio frequency (RF) communication, infrared communication, Wi-Fi, Bluetooth, Zig-Bee, and near field communication (NFC) may be applied to the communication module 310. The communication module 310 may be an NFC module. The NFC module may communicate with an NFC tag included in the wireless device 2. The NFC module may operate as a tag or a reader depending on the situation. Since NFC is bidirectional communication, the NFC is different from radio frequency identification (RFID) which uses unidirectional communication. The communication module 310 of the wireless power transmitting apparatus 1 may be referred to as a first communication module.

The communication module 310 may transmit or receive data to or from the wireless device 2. For example, the communication module 310 may receive operation setting information of the wireless device 2 from the wireless device 2. The wireless device 2 may be driven by an operation setting including settings of an operation mode and an operation time. The operation setting of the wireless device 2 may be provided by a user input or may be automatically provided. When the wireless device 2 is an electric kettle 2b, a setting of a heating temperature may correspond to the setting of the operation mode, and a setting of a heating time may correspond to the setting of the operation time. In addition, when the wireless device 2 is a blender 2a, a setting of a motor rotation speed may correspond to the setting of the operation mode, and a setting of a motor driving time may correspond to the setting of the operation time.

Furthermore, the communication module 310 may receive data about an operation state from the wireless device 2. The controller 330 may determine an operation standby, an operation start, an operation in progress, or an operation end of the wireless device 2 based on the data about the operation state received from the wireless device 2 through the communication module 310.

The driving circuit 320 may receive power from an external power supply, rectify the received power, and supply the rectified power to the transmitting coil 210 and the controller 330. In addition, the controller 330 may distribute the power transmitted from the driving circuit 320 to the fan 40, the device sensor 120, the temperature sensor 130, the weight sensor 140, the control panel 250, and the communication module 310. Alternatively, the driving circuit 320 may directly supply the rectified power to each of the transmitting coil 210, the controller 330, the fan 40, the device sensor 120, the temperature sensor 130, the weight sensor 140, the control panel 250, and the communication module 310.

Specifically, the driving circuit 320 may include a rectifying circuit 321 and an inverter circuit 322. The rectifying circuit 321 may convert alternating current (AC) power into direct current (DC) power. The rectifying circuit 321 may convert an AC voltage, of which a magnitude and polarity (positive voltage or negative voltage) are changed over time, into a DC voltage having a constant magnitude and polarity and may convert an AC current, of which a magnitude and direction (positive current or negative current) are changed over time, into a DC current having a constant magnitude.

The rectifying circuit 321 may include a bridge diode. The rectifying circuit 321 may include four diodes. Two diodes may form a diode pair connected in series, and two diode pairs may be connected in parallel with each other. The bridge diode may convert an AC voltage, of which a polarity is changed over time, into a positive voltage having a constant polarity and may convert an AC current, of which a direction is changed over time, into a positive current having a constant direction.

In addition, the rectifying circuit 321 may include a DC link capacitor. The DC link capacitor may convert a positive voltage, of which a magnitude is changed over time, into a DC voltage having a constant magnitude. The DC link capacitor may maintain and supply the converted DC voltage to the inverter circuit 322.

The inverter circuit 322 may allow a current to flow in the transmitting coil 210 by switching a voltage applied to the transmitting coil 210. The inverter circuit 322 may include a switching circuit, which supplies a current to the transmitting coil 210 or blocks the current, and a resonance capacitor. The switching circuit may include at least one switch element. One end of the transmitting coil 210 is connected to a connection point of the switch element, and the other end of the transmitting coil 210 is connected to the resonance capacitor. The switch element may be switched on or off according to a control signal of the controller 330. A current and a voltage may be applied to the transmitting coil 210 due to an (on/off) switching operation of the switch element.

The resonant capacitor serves as a buffer. The resonance capacitor affects energy loss by controlling a saturation voltage rise rate while the switch element is switched off. In addition, the resonance capacitor determines a resonance frequency of the transmitting coil 210.

Since the switch element is switched on or off at a high speed, the switching element may be implemented as a three-terminal semiconductor element switch having a fast response speed. For example, the switch element may be a bipolar junction transistor (BJT), a metal-oxide-semiconductor field effect transistor (MOSFET), an insulated gate bipolar transistor (IGBT), or a thyristor.

The transmitting coil 210 forms a magnetic field using a current applied from the inverter circuit 322. Due to the magnetic field, a current and a voltage may be applied to a receiving coil 410 of the wireless device 2 positioned in the driving area M1-1, M1-2, or M2 of the plate 11.

The controller 330 may include a processor 331 and a memory 332. The memory 332 may store programs, instructions, and data for controlling an operation of the wireless power transmitting apparatus 1. The processor 331 may generate a control signal for controlling an operation of the wireless power transmitting apparatus 1 based on the programs, instructions, and data recorded and/or stored in the memory 332.

In addition, the memory 332 may store programs, instructions, and data for controlling an operation for controlling the wireless device 2. The processor 331 may generate a control signal for controlling an operation of the wireless device 2.

The controller 330 may be implemented as a control circuit in which the processor 331 and the memory 332 are mounted. In addition, the controller 330 may include a plurality of processors and a plurality of memories. The controller 330 of the wireless power transmitting apparatus 1 may be referred to as a first controller.

The processor 331 may include a logic circuit and an arithmetic circuit as hardware. The processor 331 may process data according to programs and/or instructions provided from the memory 332 and generate a control signal according to a processing result. The memory 332 may include a volatile memory for temporarily recording data, such as a static random access memory (SRAM) or a dynamic random access memory (DRAM), and a nonvolatile memory for storing data for a long time, such as a read only memory, an erasable programmable read only memory (EPROM), or an electrically erasable programmable read only memory (EEPROM).

The memory 332 may further store characteristic information of the wireless device 2. The characteristic information of the wireless device 2 may include a type of the wireless device 2, a weight of the wireless device 2, power control information of the wireless device 2, and required power information related to operation settings. Characteristic information of various wireless devices 2 may be stored as a list. In addition, the characteristic information of the wireless device 2 may be transmitted from the wireless device 2 or acquired from an external server (not shown).

In addition, the memory 332 may further store weight information of the wireless power transmitting apparatus 1 and power data related to a weight of food. The power data related to the weight of the food includes a power value required according to the weight. The power data related to the weight of the food may be stored as a list. The power data related to the weight of the food may be transmitted from the wireless device 2 or acquired from the external server (not shown). The power data related to the weight of the food may be included in the required power information related to the operation settings.

In addition, the memory 332 may further store power data related to a load current of the wireless device 2. The power data related to the load current may also be stored as a list and may include an operating power value of the wireless device 2 corresponding to the load current.

In addition, the wireless power transmitting apparatus 1 may further include other components.

Figure 5:
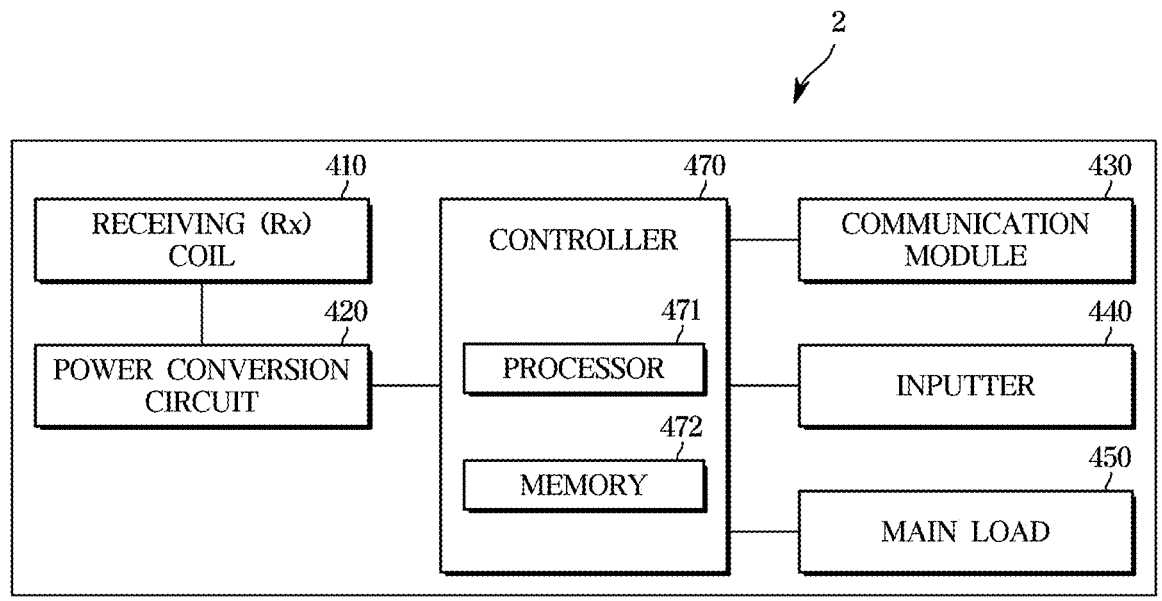
FIG. 5 is a control block diagram of a wireless device.

FIG. 5 is a control block diagram of a wireless device.

Referring to FIG. 5, a wireless device 2 may include a receiving coil 410, a power conversion circuit 420, a communication module 430, an inputter 440, a main load 450, and a controller 470. The receiving coil 410 and the power conversion circuit 420 may supply power to the communication module 430, the inputter 440, the main load 450, and the controller 470. In addition, the controller 470 may distribute the power received from the power conversion circuit 420 to each of the communication module 430, the inputter 440, and the main load 450.

The receiving coil 410 may receive power from a transmitting coil 210 of a wireless power transmitting apparatus 1. When the wireless device 2 is positioned in a driving area M1-1, M1-2, or M2 provided on a plate 11 of the wireless power transmitting apparatus 1, the receiving coil 410 receives power due to electromagnetic induction.

The power conversion circuit 420 may include a rectifying circuit. An AC voltage and an AC current may be applied to the receiving coil 410 which receives power from the transmitting coil 210. However, since the communication module 430, the inputter 440, the main load 450, and the controller 470 of the wireless device 2 require DC power, the power conversion circuit 420 is required. In addition, the power conversion circuit 420 may include a DC-to-DC converter for applying appropriate power to each component of the wireless device 2. The power conversion circuit 420 may be implemented as a switched-mode power supply (SMPS). The SMPS is a power supply device which converts and supplies AC power or DC power through a switching operation.

The communication module 430 may communicate with the wireless power transmitting apparatus 1. The communication module 430 may be implemented using various wireless communication technologies. For example, at least one of RF communication, infrared communication, Wi-Fi, Bluetooth, ZigBee, and NFC may be applied to the communication module 430. The communication module 430 may be implemented as an NFC tag. The communication module 430 of the wireless device 2 may be referred to as a second communication module.

The inputter 440 may receive a command regarding an operation of the wireless device 2 from a user. The inputter 440 may include at least one of a physical button, a touch button, and a dial. In addition, the inputter 440 may be implemented as a touch screen.

The main load 450 refers to a component that consumes the most power in the wireless device 2. For example, when the wireless device 2 is an electric kettle 2b, the main load 450 may be a heat source such as a heater. When the wireless device 2 is a blender 2a, the main load 450 may be a motor.

The controller 470 may be electrically connected to components of the wireless device 2 and may control each component. That is, the controller 470 may control the power conversion circuit 420, the communication module 430, the inputter 440, and the main load 450. The controller 470 may include a processor 471 and a memory 472. The controller 470 of the wireless device 2 may be referred to as a second controller.

Hereinafter, an operation of a wireless power transmitting apparatus according to one embodiment will be described in detail.

Figure 6:
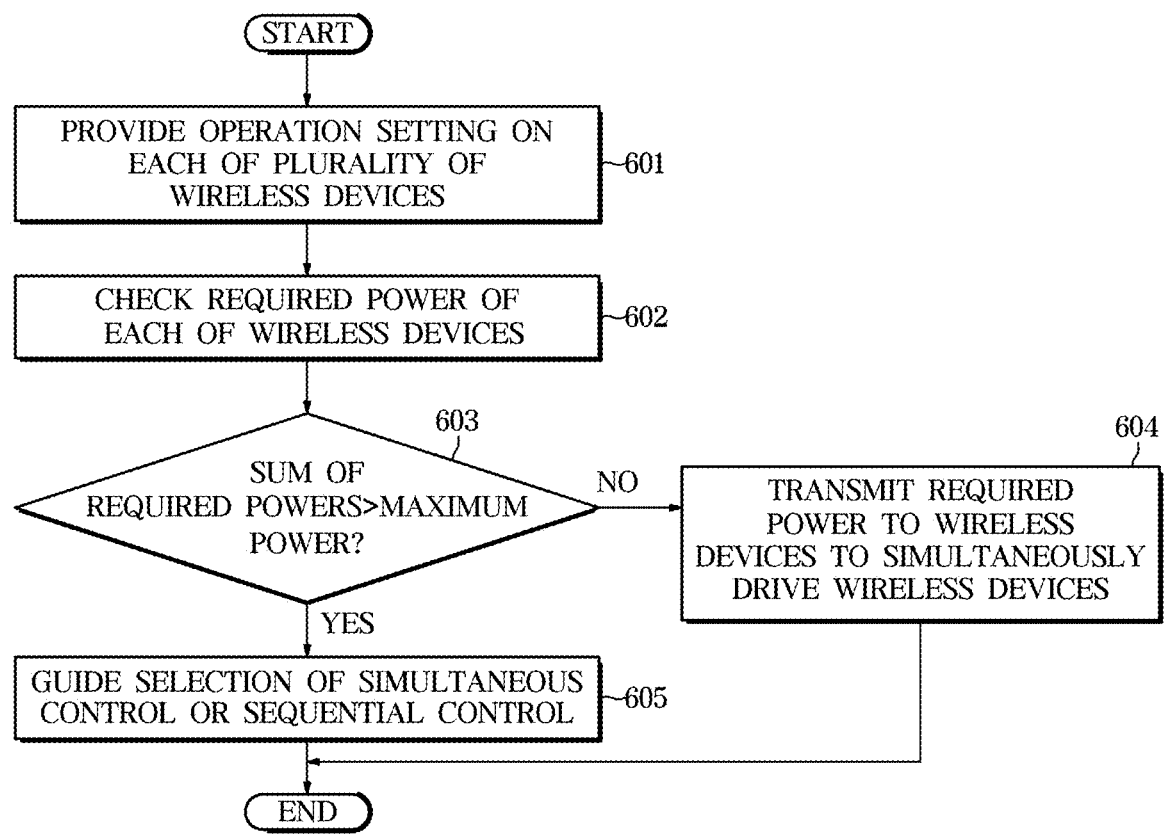
FIG. 6 is a flowchart for describing an operation of a wireless power system or a method of controlling a wireless power transmitting apparatus according to one embodiment.

FIG. 6 is a flowchart for describing an operation of a wireless power system or a method of controlling a wireless power transmitting apparatus according to one embodiment.

Referring to FIG. 6, an operation setting for each of a plurality of wireless devices 2 may be provided (601). The operation setting of the wireless device 2 may be provided by a user input or may be automatically provided. For example, the user may operate an inputter 440 of the wireless device 2 to provide the operation setting of the wireless device 2. When the wireless device 2 is connected to an external mobile device (not shown), the user may operate the external mobile device (not shown) to provide the operation setting of the wireless device 2. In addition, when the wireless device 2 is placed on a wireless power transmitting apparatus 1, a preset operation setting of the wireless device 2 may be automatically provided. When the operation setting is completed, the wireless device 2 may transmit operation setting information to the wireless power transmitting apparatus 1.

The wireless power transmitting apparatus 1 may check a required power for each of the plurality of wireless devices 2 (602). Specifically, a controller 330 of the wireless power transmitting apparatus 1 may check the required power of each wireless device 2 based on the operation setting for each of the plurality of wireless devices 2. As the operation setting of the wireless device 2 is provided, the required power of the wireless device 2 may be determined.

As described above, the operation setting of the wireless device 2 may include settings of an operation mode and an operation time, and a memory 332 may store required power information related to the operation setting of the wireless device 2. For example, in the case of an electric kettle 2b, a required power may vary according to a setting of a heating temperature. In the case of a blender 2a, a required power may vary according to a setting of a motor rotation speed. The wireless power transmitting apparatus 1 may check a required power for each of the plurality of wireless devices 2 currently positioned on an upper surface of a plate 11 in the required power information related to the operation setting of the wireless device 2 stored in the memory 332.

In addition, the wireless power transmitting apparatus 1 may obtain a weight of food accommodated in each of the plurality of wireless devices 2 and further use power data related to the weight of the food to check the required power for each of the plurality of wireless devices 2. As a weight of food accommodated in the wireless device 2 is increased, power required for an operation of the wireless device 2 may be increased. The power data related to the weight of the food may be included in the required power information related to the operation setting.

Meanwhile, when the plurality of wireless devices 2 are to be simultaneously used, it is necessary to check whether the sum of the required powers of the plurality of wireless devices 2 exceeds preset maximum power. This is because, when the sum of the required powers of the plurality of wireless devices 2 exceeds the preset maximum power that can be supplied by the wireless power transmitting apparatus 1, a problem in that the plurality of wireless devices 2 cannot be properly driven simultaneously may occur. The maximum power that can be supplied by the wireless power transmitting apparatus 1 is preset.

The wireless power transmitting apparatus 1 may determine whether the sum of the required powers of the plurality of wireless devices 2 exceeds the preset maximum power (603). When the sum of the required powers of the plurality of wireless devices 2 is less than or equal to the preset maximum power, the wireless power transmitting apparatus 1 may transmit the required power for each of the plurality of wireless devices 2 to simultaneously drive the plurality of wireless devices 2 (604).

However, when the sum of the required powers of the plurality of wireless devices 2 exceeds the preset maximum power, the wireless power transmitting apparatus 1 may display a guide screen related to selection of simultaneous control or sequential control of the plurality of wireless devices 2 on a control panel 250 (605).

In other words, the wireless power transmitting apparatus 1 may display the guide screen related to the selection of the simultaneous control or the sequential control of the plurality of wireless devices 2 on the control panel based on the sum of the required powers of the plurality of wireless devices 2 and the preset maximum power. When the sum of the required powers of the plurality of wireless devices 2 exceeds the preset maximum power, the simultaneous control or the sequential control of the plurality of wireless devices 2 can be selected, thereby improving user convenience.

In response to the selection of the simultaneous control input through the control panel 250, the wireless power transmitting apparatus 1 may adjust the operating power of at least one wireless device of the plurality of wireless devices 2 such that total wireless power transmitted to the plurality of wireless devices 2 is less than or equal to the preset maximum power. In addition, in response to the selection of the sequential control input through the control panel 250, the wireless power transmitting apparatus 1 may transmit the required power to each of the plurality of wireless devices 2 in an order determined when the sequential control is selected.

FIG. 7 is a table for describing simultaneous control and sequential control of a plurality of wireless devices.

Referring to a table 700 of FIG. 7, an electric kettle 2b and a blender 2a may be exemplified as wireless devices 2. Each of the electric kettle 2b and the blender 2a may be positioned in one of different driving areas M1-1, M1-2, and M2 of a wireless power transmitting apparatus 1. For example, as shown in FIG. 1, the blender 2a may be positioned in a second sub-driving area M1-2, and the electric kettle 2b may be positioned in a main driving area M2.

A user may input an operation setting for each of the electric kettle 2b and the blender 2a. A required power for each of the electric kettle 2b and the blender 2a may be determined by the operation setting. Required power information related to the operation setting may be prestored in a memory 332. For example, a heating temperature of the electric kettle 2b may be set to 100° C., and an operation time of the electric kettle 2b may be set to 10 minutes. In this case, the required power of the electric kettle 2b may be 1,600 W. In addition, a motor rotation speed of the blender 2a may be set to stage 1 (slowest speed), and an operation time of the blender 2a may be set to 10 minutes. In this case, the required power of the blender 2a may be 800 W.

The sum of the required power of the electric kettle 2b and the required power of the blender 2a is 2,400 W. That is, in order to simultaneously drive the electric kettle 2b and the blender 2a according to the operation setting, a power of 2,400 W is required. The maximum power that can be supplied by the wireless power transmitting may be 2,200 W.

In the case of the sequential control for sequentially driving the electric kettle 2b and the blender 2a, a required power for each of the electric kettle 2b and the blender 2a does not exceed the maximum power. Accordingly, the wireless power transmitting apparatus 1 may sequentially supply the required power to the electric kettle 2b and the blender 2a. In the sequential control, the required power may be directly determined as the operating power. In addition, an operation order of the electric kettle 2b and the blender 2a may be determined by a user input. For example, the electric kettle 2b may be operated first, and the blender 2a may be operated after the operation of the electric kettle 2b is completed. When the sequential control is selected, a wireless power of 1,600 W may be supplied to the electric kettle 2b, and a wireless power of 800 W may be supplied to the blender 2a.

However, since the sum of the required powers of the electric kettle 2b and the blender 2a exceeds the maximum power, the wireless power transmitting apparatus 1 cannot supply the total required power for simultaneously driving of the electric kettle 2b and the blender 2a, and, thus, the simultaneous control cannot be performed. Therefore, for the simultaneous control of the electric kettle 2b and the blender 2a, the operating power is adjusted for at least one wireless device of the electric kettle 2b and the blender 2a.

To this end, a controller 330 of the wireless power transmitting apparatus 1 may check whether a power of the wireless device 2 is adjustable and may adjust operating power of the wireless device 2 of which power is adjustable. The power of the wireless device 2 is adjustable or non-adjustable according to the characteristics of the wireless device 2. For example, the operating power of the electric kettle 2b including a heater is adjustable, but the operating power of the blender 2a including a motor is non-adjustable.

During the simultaneous control, the operating power of the electric kettle 2b may be adjusted to 1,400 W such that total wireless power transmitted to the electric kettle 2b and the blender 2a is less than or equal to the preset maximum power. Since the operating power of the electric kettle 2b is adjusted to be lower than the required power of 1,600 W, an operation time of the electric kettle 2b may be increased to 15 minutes. That is, a time it takes to reach a set temperature of 100° C. may be increased due to the operating power lower than the required power. The operating power of the blender 2a may be determined as 800 W which is equal to the required power.

When the operating power of the electric kettle 2b is adjusted to 1,400 W, the total wireless power to be transmitted to the electric kettle 2b and the blender 2a by the wireless power transmitting apparatus 1 becomes 2,200 W. Since the total wireless power of 2,200 W is equal to the maximum power of 2,200 W of the wireless power transmitting apparatus 1, the wireless power transmitting apparatus 1 can supply power to both the electric kettle 2b and the blender 2a, and accordingly, the electric kettle 2b and the blender 2a can be simultaneously operated. When the simultaneous control is selected, a wireless power of 1,400 W may be supplied to the electric kettle 2b, and a wireless power of 800 W may be supplied to the blender 2a.

When the sum of the required powers of the plurality of wireless devices 2 exceeds the preset maximum power, the wireless power transmitting apparatus 1 may display a guide screen related to selection of the simultaneous control or the sequential control on a control panel 250. When a user selects the simultaneous control, the adjusted operating power may be transmitted to at least one of the wireless devices 2. When the user selects the sequential control, the required power is transmitted to the wireless devices 2, and the wireless devices 2 may be operated in an order determined by the user.

Figure 8:
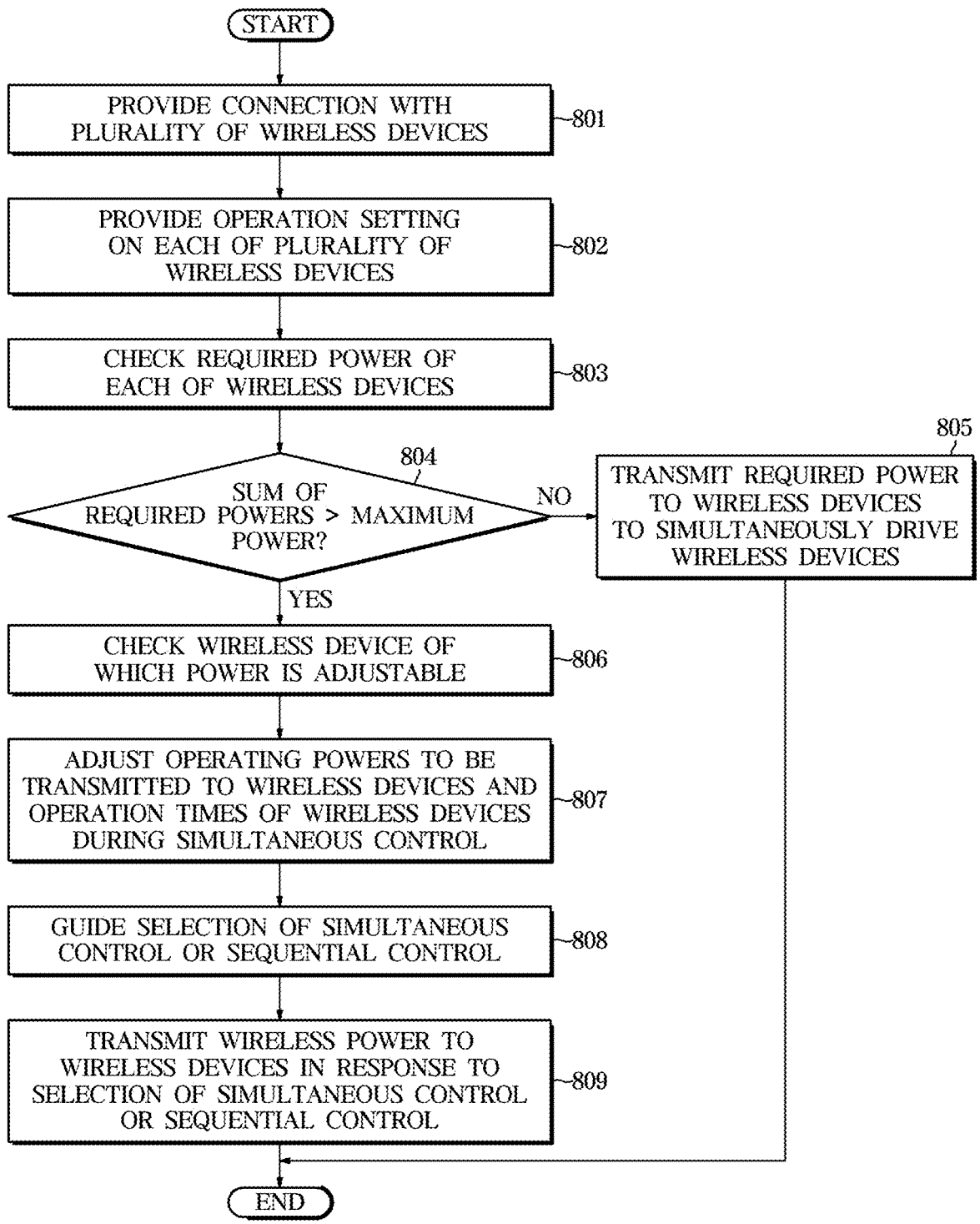
FIG. 8 is a flowchart for describing an operation of a wireless power system or a method of controlling a wireless power transmitting apparatus according to one embodiment in more detail.
Figure 9:
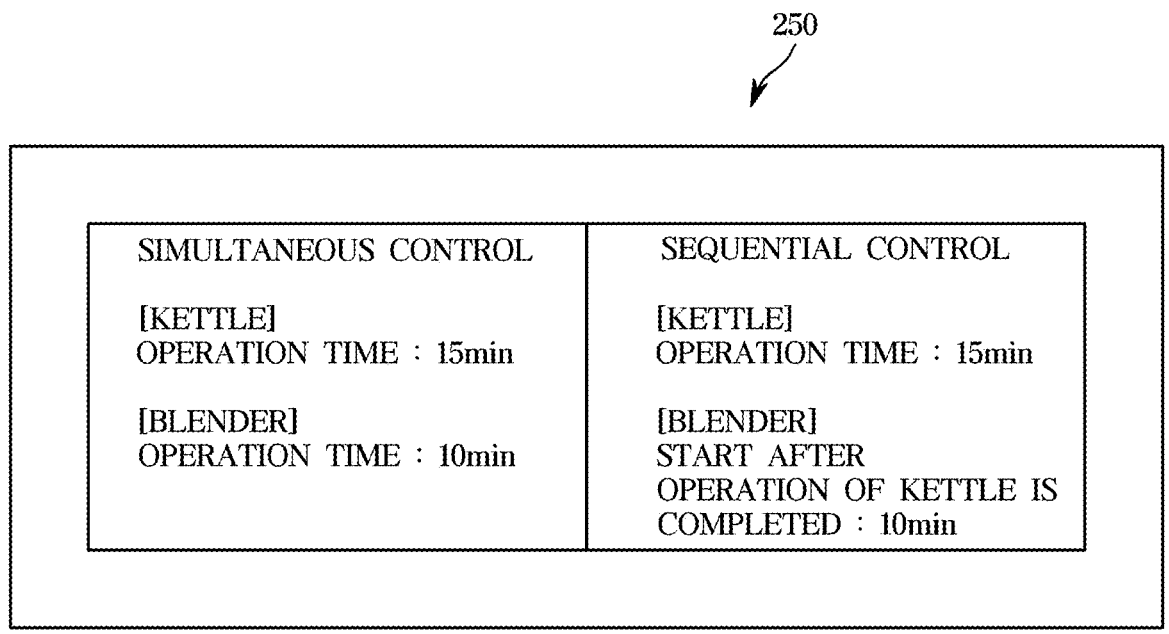
FIG. 9 shows an example of a guide screen related to selection of simultaneous control or sequential control of a plurality of wireless devices.

FIG. 8 is a flowchart for describing an operation of a wireless power system or a method of controlling a wireless power transmitting apparatus according to one embodiment in more detail. FIG. 9 shows an example of a guide screen related to selection of simultaneous control or sequential control of a plurality of wireless devices.

Referring to FIG. 8, a wireless power transmitting apparatus 1 may be connected to a plurality of wireless devices 2 positioned in driving areas M1-1, M1-2, and M2 of a plate 11 (801). The wireless power transmitting apparatus 1 may be connected to the plurality of wireless devices 2 using various communication methods, but preferably, NFC communication may be used. Then, an operation setting for each of the plurality of wireless devices 2 may be provided (802). The operation setting of the wireless device 2 may be provided by a user input or may be automatically provided. Each of the plurality of wireless devices 2 may transmit operation setting information to the wireless power transmitting apparatus 1.

A controller 330 of the wireless power transmitting apparatus 1 may check a required power of each wireless device 2 based on the operation setting for each of the plurality of wireless devices 2 (803). Specifically, the controller 330 of the wireless power transmitting apparatus 1 may check the required power of the wireless devices 2 from required power information related to the operation setting of the wireless devices 2.

The controller 330 of the wireless power transmitting apparatus 1 may determine whether the sum of the required powers of the plurality of wireless devices 2 exceeds preset maximum power (804). When the sum of the required powers of the plurality of wireless devices 2 is less than or equal to the preset maximum power, the wireless power transmitting apparatus 1 may transmit the required power to each of the plurality of wireless devices 2 to simultaneously drive the plurality of wireless devices 2 (805). The controller 330 of the wireless power transmitting apparatus 1 may control a driving circuit 320 to transmit the required power through transmitting coils 210 corresponding to positions of the plurality of wireless devices 2.

When the sum of the required powers of the plurality of wireless devices 2 exceeds the preset maximum power, the controller 330 of the wireless power transmitting apparatus 1 may check whether a wireless device, of which power is adjustable, is present among the plurality of wireless devices 2 (806). Whether power is adjustable may be checked from characteristic information of each wireless device 2. The characteristic information of the wireless device 2 may be prestored in a memory 332, transmitted from the wireless device 2, or acquired from an external server (not shown).

When the wireless device, of which the power is adjustable, is present among the plurality of wireless devices 2, the controller 330 of the wireless power transmitting apparatus 1 may adjust an operating power to be transmitted to the wireless device of which the power is adjustable and an operation time of the wireless device of which the power is adjustable (807). During simultaneous control, the controller 330 of the wireless power transmitting apparatus 1 may adjust the operating power to be transmitted to the wireless device of which the power is adjustable such that total wireless power transmitted to the plurality of wireless devices 2 is less than or equal to the preset maximum power. The controller 330 of the wireless power transmitting apparatus 1 may determine an adjustment value of the operating power based on a difference between the sum of the required powers of the plurality of wireless devices 2 and the preset maximum power.

For example, when the plurality of wireless devices 2 include a first wireless device of which power is adjustable and a second wireless device of which power is non-adjustable, the controller 330 of the wireless power transmitting apparatus 1 may adjust the operating power of the first wireless device. When the operating power of the first wireless device is adjusted, during the simultaneous control, total wireless power transmitted to the plurality of wireless devices 2 may be less than or equal to the preset maximum power. The first wireless device of which the power is adjustable may be an electric kettle 2b, and the second wireless device of which the power is non-adjustable may be a blender 2a.

As another example, when the plurality of wireless devices 2 include a first wireless device of which power is adjustable and a second wireless device of which power is adjustable, the controller 330 of the wireless power transmitting apparatus 1 may adjust the operating power of the first wireless device or the operating power of the second wireless device. Accordingly, during the simultaneous control, total wireless power transmitted to the plurality of wireless devices 2 may be less than or equal to the preset maximum power. The first wireless device of which the power is adjustable and the second wireless device of which the power is adjustable may both be the electric kettles 2b.

Among the first wireless device of which the power is adjustable and the second wireless device of which the power is adjustable, a target of which power is to be adjusted may be determined based on an operation time of the first wireless device and an operation time of the second wireless device which are set through an operation setting. Specifically, when the operation time of the first wireless device is shorter than the operation time of the second wireless device, the first wireless device may be the target of which the power is to be adjusted. Alternatively, when an operation start time of the first wireless device is later than an operation start time of the second wireless device, the first wireless device may be the target of which the power is to be adjusted.

In addition, among the first wireless device of which the power is adjustable and the second wireless device of which the power is adjustable, the target of which the power is to be adjusted may be determined based on types of driving areas in which the first wireless device and the second wireless device are positioned. Specifically, a wireless device positioned in a sub-driving area M1-1 or M1-2 may be the target of which the power is to be adjusted. When the first wireless device is positioned in a first sub-driving area M1-1, the second wireless device is positioned in a main driving area M2, and the operation time of the first wireless device and the operation time of the second wireless device are the same, the first wireless device may be the target of which the power is to be adjusted.

The controller 330 of the wireless power transmitting apparatus 1 may control a control panel 250 to display a guide screen related to selection of the simultaneous control or sequential control of the plurality of wireless devices 2 (808).

As shown in FIG. 9, the controller 330 of the wireless power transmitting apparatus 1 may control the control panel 250 to display a first operation time of the first wireless device determined according to an adjustment of the operating power of the first wireless device and a second operation time of the second wireless device set through an operation setting as simultaneous control information. When an electric kettle 2b as the first wireless device of which the power is adjustable and a blender 2a as the second wireless device of which the power is non-adjustable are simultaneously controlled, FIG. 9 shows a screen for announcing that operation times of the devices are 15 minutes and 10 minutes. As described with reference to FIG. 7, during the simultaneous control, as the operating power of the electric kettle 2b of which the power is adjustable is adjusted, an operation time thereof may also be adjusted simultaneously.

In addition, the controller 330 of the wireless power transmitting apparatus 1 may control the control panel 250 to display the operation time of the first wireless device and the operation time of the second wireless device set through an operation setting as sequential control information. When the electric kettle 2b as the first wireless device of which the power is adjustable and the blender 2a as the second wireless device of which the power is non-adjustable are sequentially controlled, FIG. 9 shows a screen for announcing that operation times of the devices are 10 minutes and an operation of the blender 2a is started after an operation of the electric kettle 2b is completed. An operation order of the blender 2a and the electric kettle 2b may be changed by a user.

The wireless power transmitting apparatus 1 may transmit wireless power to the wireless devices 2 in response to selection of simultaneous control or sequential control input through the control panel 250 (809). The controller 330 of the wireless power transmitting apparatus 1 may control the driving circuit 320 to transmit the adjusted operating power to at least one wireless device of the plurality of wireless devices 2 in response to the selection of the simultaneous control input through the control panel 250.

In addition, in response to the selection of the sequential control input through the control panel 250, the controller 330 may control the driving circuit 320 to transmit the requested power to each of the plurality of wireless devices 2 in an order determined when the sequential control is selected.

As described above, when the sum of the required powers of the plurality of wireless devices 2 exceeds the preset maximum power, the wireless power transmitting apparatus 1 may first calculate an operating power value to be transmitted to a wireless device, of which power is adjustable, and an operation time in preparation for simultaneous control and may guide a user to select simultaneous control or sequential control. Accordingly, user convenience can be improved, and the wireless power transmitting apparatus 1 and the wireless device 2 can be efficiently used.

Figure 10:
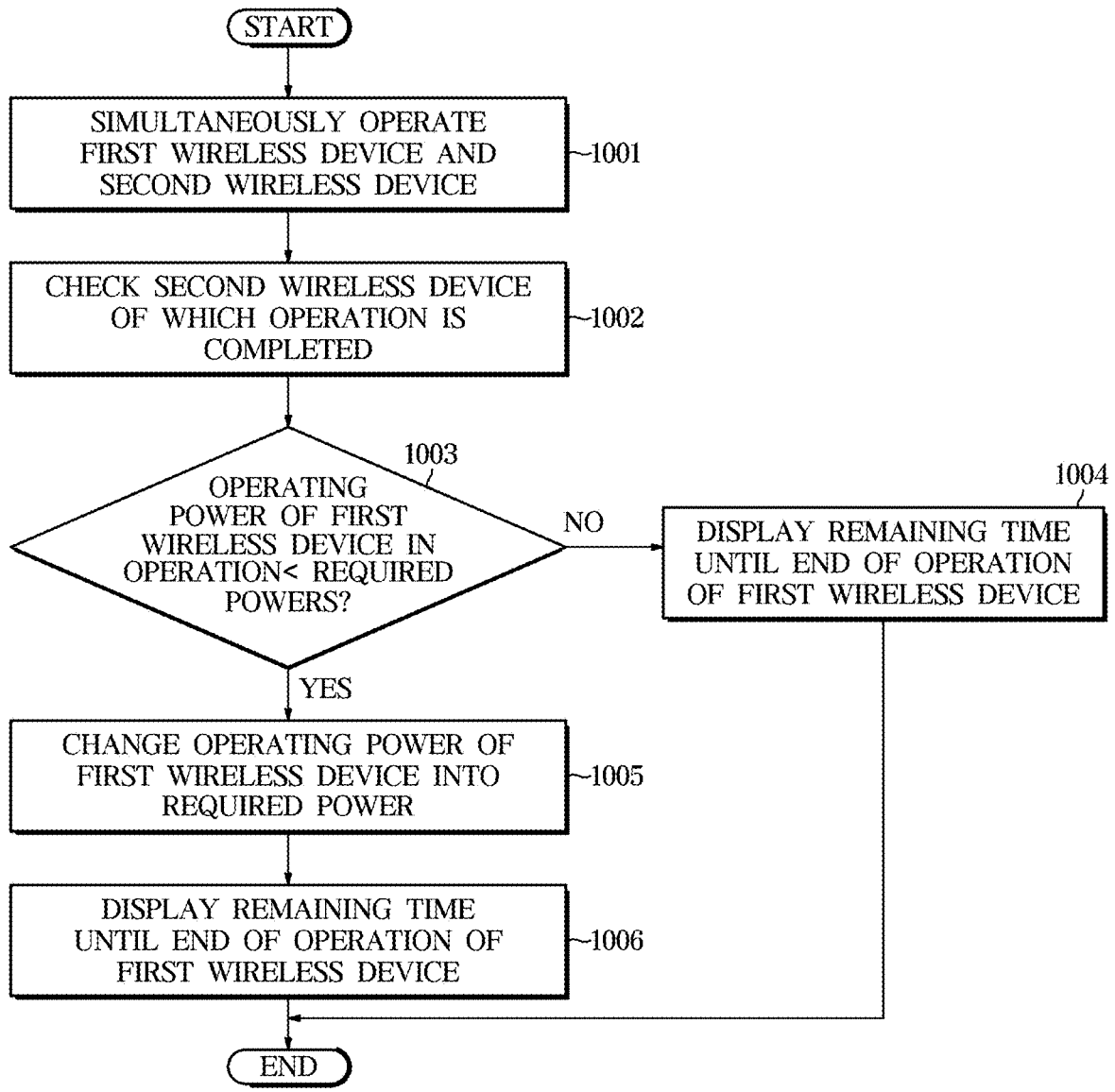
FIG. 10 is a flowchart for describing a power adjustment of the remaining wireless devices when there is a wireless device of which an operation is ended first among a plurality of wireless devices.
Figure 11:
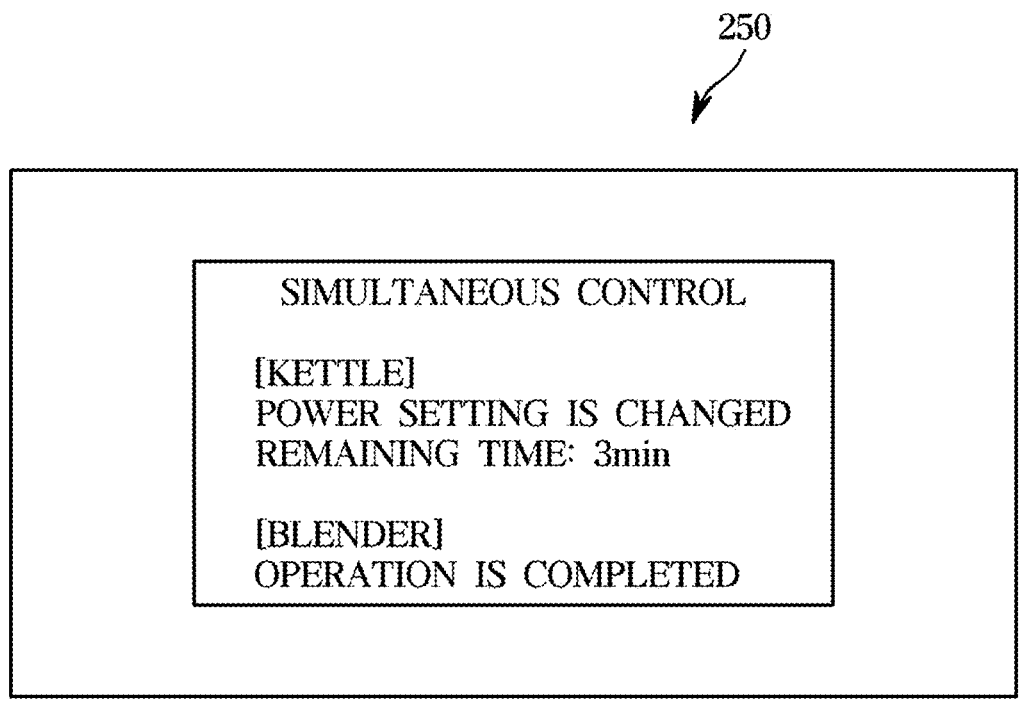
FIG. 11 shows an example of a screen displayed on a control panel in relation to FIG. 10.

FIG. 10 is a flowchart for describing a power adjustment of the remaining wireless devices when there is a wireless device of which an operation is ended first among a plurality of wireless devices. FIG. 11 shows an example of a screen displayed on a control panel in relation to FIG. 10.

Referring to FIG. 10, a first wireless device and a second wireless device may be simultaneously operated as a plurality of wireless devices 2 through simultaneous control (1001). Referring also to FIG. 7, the first wireless device may be an electric kettle 2b, and the second wireless device may be a blender 2a. In addition, during the simultaneous control, since an operation time of the electric kettle 2b is 15 minutes and an operation time of the blender 2a is 10 minutes, an operation of the blender 2a may be completed first.

A controller 330 of a wireless power transmitting apparatus 1 may first identify the second wireless device of which an operation is completed first (1002). In addition, the controller 330 of the wireless power transmitting apparatus 1 may check whether the operating power of the first wireless device in operation is adjusted to be lower than a required power through an initial operation setting (1003). When the operating power of the first wireless device in operation is equal to the required power, the controller 330 of the wireless power transmitting apparatus 1 may control a driving circuit 320 to maintain the operating power of the first wireless device in operation (1004).

However, when the operating power of the first wireless device in operation is lower than the required power, the controller 330 of the wireless power transmitting apparatus 1 may change the operating power of the first wireless device into the required power of the first wireless device (1005) and may calculate and display a remaining time until an end of the operation of the first wireless device (1006).

As described with reference to FIG. 7, for the simultaneous control, the operating power of the electric kettle 2b is adjusted to be lower than the required power. Accordingly, when the operation of the blender 2a is completed, the operating power of the electric kettle 2b may be changed into a required power of 1,600 W. As the operating power of the electric kettle 2b is increased, the operation of the electric kettle 2b may be ended sooner. That is, a remaining time until an end of the operation of the electric kettle 2b may be changed.

As shown in FIG. 11, a screen for announcing that the operating power of the electric kettle 2b is changed and the remaining time is changed into 3 minutes along with announcing that the operation of the blender 2a is completed may be displayed on a control panel 250.

In other words, when the operation of the second wireless device is ended first, the controller 330 of the wireless power transmitting apparatus 1 may change the operating power of the first wireless device into the required power of the first wireless device at a time point at which the operation of the second wireless device is ended and may control the control panel 250 to display a remaining time until an end of the operation of the first wireless device. As described above, efficient power control is possible by appropriately changing thew operating power of a wireless device of which power is adjustable.

FIG. 12 illustrates a method of controlling a wireless power transmitting apparatus for adjusting the operating power according to food accommodated in a wireless device.

Referring to FIG. 12, a wireless power transmitting apparatus 1 may be connected to wireless devices 2 positioned in driving areas M1-1, M1-2, and M2 of a plate 11 (1201). In FIG. 12, the wireless device 2 may be exemplified as one blender 2a. A controller 330 of the wireless power transmitting apparatus 1 may obtain a weight of food accommodated in the wireless device 2 (1202). The controller 330 may obtain the weight of the food accommodated in the wireless device 2 by subtracting a weight of the wireless power transmitting apparatus 1 and a weight of the wireless device 2 from the total weight of the wireless power transmitting apparatus 1 and the wireless device 2 accommodating the food.

Next, the controller 330 of the wireless power transmitting apparatus 1 may determine the operating power of the wireless device 2 using power data related to the weight of the food (1203) and may transmit the determined operating power to the wireless device 2. The controller 330 may determine the operating power of the wireless device 2 corresponding to the weight of the food from the power data related to the weight of the food. The operating power of the wireless device 2 may be determined differently according to the weight of the food accommodated in the wireless device 2. For example, as the weight of the food accommodated in the wireless device 2 is increased, the operating power of the wireless device 2 may be increased.

In addition, the controller 330 of the wireless power transmitting device may detect a load current of the wireless device 2 while the wireless device 2 is in operation (1205) and may adjust the operating power of the wireless device 2 using power data related to the load current (1206). In addition, the controller 330 may also adjust an operation time of the wireless device 2 according to the adjustment of the operating power of the wireless device 2.

The load current of the wireless device 2 may vary according to a change in state of the food. The controller 330 of the wireless power transmitting apparatus 1 supplies the operating power corresponding to the load current of the wireless device 2 to the wireless device 2 so that efficient power control is possible.

For example, when the food accommodated in the blender 2a is an apple, a load applied to a motor of the blender 2a may be great due to the apple, which is not ground up, upon initial operation of the blender 2a, and accordingly, a load current applied to the motor of the blender 2a may be great. However, as the apple is ground up, the load applied to the motor of the blender 2a may be decreased. When the load current of the blender 2a is decreased, it is possible to reduce wireless power supplied by the wireless power transmitting apparatus 1, thereby reducing power consumption.

As described above, according to the disclosed wireless power system, wireless power transmitting apparatus, and method of the wireless power transmitting apparatus, it is possible to adjust the operating power to be transmitted to a plurality of wireless devices, and it is possible to guide a user to select simultaneous control or sequential control. Accordingly, even when the required power of the plurality of wireless devices exceeds a maximum power of the wireless power transmitting apparatus, the plurality of wireless devices can be efficiently used, and efficient power control is possible.

In addition, according to the wireless power system, the wireless power transmitting apparatus, and the method of controlling the wireless power transmitting apparatus, it is possible to determine the operating power of the wireless device according to a weight of food accommodated in the wireless device, and it is possible to adjust the operating power of the wireless device according to a change in load current of the wireless device. Accordingly, it is possible to efficiently control power and manage an operating time of the wireless device.

Meanwhile, the disclosed embodiments can be implemented as recording media for storing computer-executable instructions. The instructions can be stored in the form of program code and generate, when executed by a processor, a program module such that the operation of the provided embodiments can be performed.

A machine-readable storage medium may be provided in the form of a non-transitory storage medium. Here, the term "non-transitory" simply means that the storage medium is a tangible device and does not include a signal (for example, an electromagnetic wave), but this term does not differentiate between a case in which data is semi-permanently stored in the storage medium and a case in which the data is temporarily stored in the storage medium. For example, the "non-transitory storage medium" may include a buffer in which data is temporarily stored.

A method according to various embodiments disclosed in the present document may be included and provided in a computer program product. The computer program product may be traded as a product between a seller and a buyer. The computer program product may be distributed in the form of a machine-readable storage medium (for example, a compact disc read only memory (CD-ROM)) or be distributed (for example, downloaded or uploaded) online via an application store (for example, Play Store™), or between two user devices (for example, smart phones) directly. When distributed online, at least a part of a computer program product (for example, a download application (app)) may be temporarily generated or at least temporarily stored in a machine-readable storage medium, such as a memory of a manufacturer's server, a server of an application store, or a relay server.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooktop transmitting wireless power comprising:
   a plate including a plurality of driving areas where a plurality of wireless devices accommodating food are disposed;
   a control panel including an inputter and a display;
   a plurality of transmitting coils provided at a position corresponding to each of the plurality of driving areas, and configured to transmit wireless power to a receiving coil of each of the plurality of wireless devices positioned on an upper surface of the plate;
   a driving circuit configured to apply a current to each of the plurality of transmitting coils;
   a communication module configured to communicate with the plurality of wireless devices; and
   a processor configured to:
      identify a required power of each wireless device based on an operation setting for each of the plurality of wireless devices;
      determine whether a sum of required powers of the plurality of wireless devices exceeds a preset maximum power; and
      based on determining that the sum of required powers of the plurality of wireless devices exceeds the preset maximum power, control the control panel to display a guide screen guiding a selection of simultaneous control for simultaneously operating the plurality of wireless devices or a selection of sequential control for sequentially operating the plurality of wireless devices,
   wherein the guide screen includes simultaneous control information and sequential control information,
   the simultaneous control information includes operation times of each of the plurality of wireless devices related to the selection of the simultaneous control, and
   the sequential control information includes operation times of each of the plurality of wireless devices related to the selection of sequential control.

2. The cooktop transmitting wireless power of claim 1, wherein the processor is further configured to:
   in response to the selection of the simultaneous control through the control panel, adjust an operating power of at least one wireless device of the plurality of wireless devices such that a total wireless power transmitted to the plurality of wireless devices is less than or equal to the preset maximum power; and
   in response to the selection of the sequential control through the control panel, control the driving circuit to transmit the required power to each of the plurality of wireless devices in an order determined when the sequential control is selected.

3. The cooktop transmitting wireless power of claim 1, wherein the processor is further configured to:
   check whether power for each of the plurality of wireless devices is adjustable; and
   when the plurality of wireless devices include a first wireless device of which power is adjustable and a second wireless device of which power is non-adjustable, during the simultaneous control, adjust an operating power of the first wireless device such that total wireless power transmitted to the plurality of wireless devices is less than or equal to the preset maximum power.

4. The cooktop transmitting wireless power of claim 3, wherein the simultaneous control information includes a first operation time of the first wireless device determined according to the adjustment of the operating power of the first wireless device, and a second operation time of the second wireless device set by an operation setting of the second wireless device.

5. The cooktop transmitting wireless power of claim 3, wherein, when an operation of the second wireless device is ended first, the processor is further configured to:
   change the operating power of the first wireless device into a required power of the first wireless device at a time point at which the operation of the second wireless device is ended, and
   control the control panel to display a remaining time until an end of an operation of the first wireless device.

6. The cooktop transmitting wireless power of claim 1, wherein, when the plurality of wireless devices include a first wireless device of which power is adjustable and a second wireless device of which power is adjustable, the processor is further configured to adjust an operating power of the first wireless device or an operating power of the second wireless device based on a first operation time of the first wireless device set by a first operation setting of the first wireless device and a second operation time of the second wireless device set by a second operation setting of the second wireless device.

7. The cooktop transmitting wireless power of claim 6, wherein the sequential control information includes the first operation time of the first wireless device and the second operation time of the second wireless device.

8. The cooktop transmitting wireless power of claim 1, wherein, when the plurality of wireless devices include a first wireless device of which power is adjustable and a second wireless device of which power is adjustable, the processor is further configured to adjust an operating power of the first wireless device or an operating power of the second wireless device based on types of driving areas in which the first wireless device and the second wireless device are positioned.

9. The cooktop transmitting wireless power of claim 1, wherein the processor is further configured to:
   obtain a weight of the food accommodated in each of the plurality of wireless devices, and
   use power data related to the weight of the food to determine the required power for each of the plurality of wireless devices.

10. The cooktop transmitting wireless power of claim 1, wherein the control panel comprises at least one of a touch button and a touch screen.

* * * * *